United States Patent [19]
Yada et al.

[11] Patent Number: 5,662,851
[45] Date of Patent: Sep. 2, 1997

[54] METHOD OF PRODUCING A MOLDING

[75] Inventors: Yukihiko Yada; Tosikazu Ito, both of Nagoya, Japan

[73] Assignee: Tokai Kogyo Kabushiki Kaisha, Ohbu, Japan

[21] Appl. No.: 473,781

[22] Filed: Jun. 6, 1995

Related U.S. Application Data

[62] Division of Ser. No. 427,685, Apr. 24, 1995, Pat. No. 5,474,817, which is a continuation of Ser. No. 195,837, Feb. 14, 1994, abandoned, which is a continuation of Ser. No. 835,504, Feb. 14, 1992, abandoned.

[30] Foreign Application Priority Data

Feb. 15, 1991 [JP] Japan ......................... 3-44376
Feb. 22, 1991 [JP] Japan ......................... 3-50841

[51] Int. Cl.⁶ .......................... B29C 47/06; B29C 47/16
[52] U.S. Cl. ............ 264/167; 264/171.16; 264/171.17; 264/173.17; 264/173.18; 264/177.1
[58] Field of Search ................ 264/171.14, 171.16, 264/171.17, 171.18, 171.19, 173.16, 173.18, 173.17, 173.12, 173.13, 167, 177.1; 156/211, 244.11, 244.12; 428/31

[56] References Cited

U.S. PATENT DOCUMENTS

| | | | |
|---|---|---|---|
| 3,881,042 | 4/1975 | Ungerer | 428/31 |
| 4,002,362 | 1/1977 | Sears et al. | 428/31 |
| 4,349,592 | 9/1982 | Nussbaum | 428/31 |
| 4,566,929 | 1/1986 | Waugh | 264/1.9 |
| 4,963,403 | 10/1990 | Roberts et al. | 428/31 |
| 5,087,488 | 2/1992 | Cakmakci | 264/177.1 |
| 5,104,305 | 4/1992 | Kawaguchi et al. | 425/132 |
| 5,171,499 | 12/1992 | Cehelnik et al. | 264/151 |
| 5,320,793 | 6/1994 | Lombard | 425/132 |

FOREIGN PATENT DOCUMENTS

| | | | |
|---|---|---|---|
| 59-150657 | 10/1984 | Japan | 428/31 |
| 4-357100 | 12/1992 | Japan | 264/177.1 |

*Primary Examiner*—Mathieu D. Vargot
*Attorney, Agent, or Firm*—Oblon, Spivak, McClelland, Maier & Neustadt, P.C.

[57] ABSTRACT

A molding method which provides a relatively simple structure, while also providing a pleasing appearance which is adaptable to a variety of ornamental and artistic applications. The molding is produced by extruding an ornamental core, and joining trimming portions to the sides of the ornamental core. Where the ornamental core and trimming are formed of materials which can be readily joined together, the trimming is melt bonded directly to the side surfaces of the ornamental core. Alternatively, a foil laminate can be provided, and the ornamental core is joined to an upper layer of the foil laminate, with the trimming joined to a lower layer of the foil laminate. If desired, the width of the ornamental coil can be changed during extrusion molding, such that the width varies along the longitudinal direction of the molding.

14 Claims, 11 Drawing Sheets

METHOD OF PRODUCING A MOLDING

This is a Division of application Ser. No. 08/427,685 filed on Apr. 24, 1995, now U.S. Pat. No. 5,474,817, which is a continuation of application Ser. No. 08/195,837 filed on Feb. 14, 1994 now abandoned, which is a continuation of Ser. No. 07/835,504 filed on Feb. 14, 1992, also abandoned.

BACKGROUND OF THE INVENTION

1. Field of the Invention

This invention relates to a molding and the production method thereof, said molding comprising, an ornamental core extrusion molded in such a way that its ornamental surface is exposed to the outside, and a trimming consisting of other extrusion-molded material integrally covering both sides of said ornamental core.

2. Description of the Prior Art

In general, elongated moldings are widely used as ornamental components for the improvement of aesthetic appearance in vehicles such as automobiles, surface vessels, and the like. Such moldings for ornamental purposes are molded in such a way that their ornamental surfaces are exposed to the outside, and extrusion molded articles have hitherto been widely employed therefor.

In recent years, in order to enhance the degree of molding ornamentation, as described in the Patent Disclosure No. Showa 60-199629 Official Report, technology has been proposed whereby the molding width of moldings is made variable by moving the molding die of an extrusion molding machine. With such uneven-width moldings, the visible width may be made o vary in order to improve the ornamental trimming functions of such molding.

Nevertheless, conventional moldings consisting of a main molded body of simple monobloc structure seem to be lacking in their degree of ornamentation and durability. Alternatively, technology has been proposed whereby the molding width is varied in he longitudinal direction while combining different kinds of element materials such as proposed in the Patent Disclosure No. Showa 63-24256 Official Report, etc., but many steps of complex processes are required, such a cutting, etc.

Also, technology has been proposed whereby two different kinds of incompatible synthetic resins are integrally combined by use o shiny tape thus improving the degree of ornamentation and durability, as described in the Patent Disclosure No. Showa 61-62099 Official Report, Patent Disclosure No. Heisei 2-29719 Official Report and Patent Disclosure No. Heisei 2-42090 Official Report, but with this technology, the molding width is fixed along the longitudinal direction and because of this, the degree of ornamentation is limited.

Further, technology has been proposed whereby trimming made of a synthetic resin is processed by cutting and end adhesion to obtain the required molded structure, as disclosed in the Patent Disclosure No. Showa 48-73480 Official Report, but cuttings marks and adhesion lines remain visible, thus deteriorating the external appearance. In addition, it may lack in adhesive reliability at adhered sections and further, it requires a greater number of processes. Similarly, technology has been proposed whereby shaping or fairing processes are included in the technology, as in the Patent Disclosure No. Showa 54-11977 Official Report, but this technology also has similar problems to the aforementioned types.

Furthermore, ornamental technology has been proposed whereby the intended shape may be obtained by use of a blow molding die as described in the Paten Disclosure No. Showa 60-125632 Official Report, but when applying this method to elongated moldings, large-size dies and large-size molding machines are required and, furthermore, the ornamental item itself needs to be molded independently prior to the blow molding process, thus causing the problem of considerable expense being incurred for the dies and actual molding process.

SUMMARY OF THE INVENTION

This invention, therefore, intends to provide a molding of simple structure but with a satisfactory degree of ornamentation and artistic features.

To achieve the above purpose, a first aspect of the invention relates to a molding with a structure integrally consisting of an elongated ornamental core extrusion molded in such a way that the desired surface is exposed to the outside, and of an elongated trimming extrusion molded along the sides of said ornamental core.

With a feature whereby the molding width of the exposed surface of the ornamental core at a right angle to the longitudinal direction varies along the longitudinal direction of said ornamental core, but also the overall molding width combining the molding width of said ornamental core and the molding width of said trimming varies corresponding to the molding width of said ornamental core.

A second aspect of the invention resides in providing a molding made through a production method whereby an elongated ornamental core is extruded in such a way that the desired surface may be exposed to the outside through use of an extrusion molding die, and whereby at the same time, a trimming may be integrally extruded along the sides of said ornamental core, and said extrusion molding is made in such a way that the molding width of the exposed surface of said ornamental core at a right angle to the longitudinal direction varies along the longitudinal direction of said ornamental core, and also said extrusion molding is made in such a way that the overall molding width combining the molding width of said ornamental core and the molding width of said trimming varies corresponding to the molding width of said ornamental core.

A third aspect of the invention relates to the provision of trimming along both sides of the ornamental core as mentioned in the descriptions of the first aspect is integrally attached to said ornamental core by means of an adhering body overlying the unexposed rear side of the ornamental core, which is the reverse side of the exposed surface of said ornamental core, and said adhering body being made of a type of resin which possesses compatibility with said trimming.

A fourth aspect of the invention resides in providing a molding as mentioned in the descriptions of the first aspect or the third aspect, whereby a thin laminated foil is adhered tightly to the rear unexposed side of the ornamental core to achieve collective adhesion of the upper end layer of said lamination to said ornamental core and of the lower end layer of said lamination to said trimming.

A fifth aspect of the invention resides in providing a structure wherein the ornamental core as mentioned in the description of the fourth invention is molded using a transparent resin.

Thus, with the first aspect and the fifth aspect, a trimming of a certain width is attached to the sides of the ornamental core by which the molding width varies along the longitudinal direction, thus achieving improvement in the degree of ornamentation.

Further, with the special feature of molding the ornamental core using a transparent resin to show the surface color of the laminated thin foil adhered to the ornamental core, the surface color of the thin laminated foil may be seen from the outside, thus further enhancing the degree of ornamentation.

Thus, the first invention or the fifth invention enables the easy, reliable production of a molding of simple structure and with a satisfactory degree of ornamentation and artistic features by varying the overall molding width, combining the molding width of the ornamental core and the molding width of the trimming, corresponding to the molding width of the ornamental core, while integrally molding a certain width of the trimming along the sides of said ornamental core of which the molding width is varied along the longitudinal direction.

In accordance with a sixth aspect of the present invention, a molding is provided whereby an elongated ornamental core extrusion molded in such a way that the desired surface exposed to the outside and an elongated trimming extrusion molded along both sides of said ornamental core are integrally attached, said ornamental core being provided with a thinned section toward which the molding width of the exposed surface at a right angle to the longitudinal direction of said ornamental core narrows down, and said trimming being provided with a merging section at which the trimmings are joined together.

A seventh aspect provides a molding a mentioned in the description of the sixth aspect, whereby thinned sections are provided at several positions along the longitudinal direction of said ornamental core, thus providing several sections of ornamental core portions along the length of said molding, while merging sections of the trimming are provided by molding a desired length across the thinned sections of said ornamental core portions.

Thus by the sixth aspect and the seventh aspect, the feature whereby the molding width of the ornamental core varies longitudinally while, at the same time, thinned sections are provided midway, and the feature that the trimming integrally provided along both sides of the ornamental core has merging sections across the thinned sections of said ornamental core, contribute to providing variations in the appearance, thus improving the degree of ornamentation.

Particularly for the molding in which the merging section of the trimming is molded to fill out to the full shape for the desired length, the variation in the appearance of the molding is emphasized to further enhance the degree of ornamentation.

As mentioned above, by the sixth aspect and the seventh aspect, the molding width of the ornamental core is made to vary along the longitudinal direction and thinned sections are provided midway, while the trimming molded along the sides of said ornamental core is provided with merging sections, thus surely facilitating the production of moldings of simple structure but with a satisfactory degree of ornamentation and artistic features.

DESCRIPTION OF THE PREFERRED EMBODIMENTS

Figure 1:
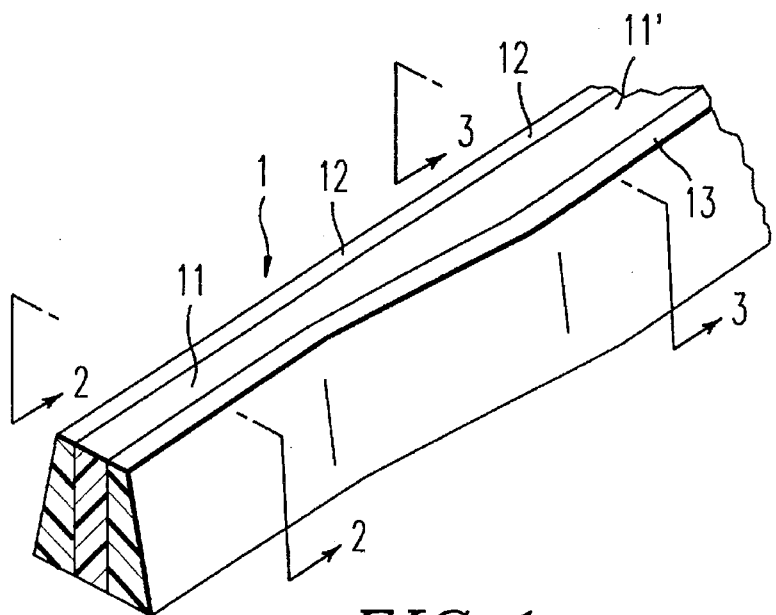
[FIG. 1] An inclined explanatory drawing of the structure of the molding in an embodiment of this invention.

Referring more particularly to the exemplary embodiments of the present invention as indicated in the drawings, molding 1 shown in FIG. 1 has ornamental core 11 molded in an elongated form and trimmings 12 and 13 molded so that they can be placed along both sides of ornamental core 11, in a single integrated body. Ornamental core 11 is made by extrusion molding of a red PVC resin material and the transverse sections intersecting orthogonally in the longitudinal direction are shaped in a rectangular form, and the surface of the upper side shown in the figure is exposed to the outside.

Trimmings 12 and 13 are made by extrusion molding of a black PVC resin material and designed in a trapezoid transverse section provided with an inclined side.

Figure 2:
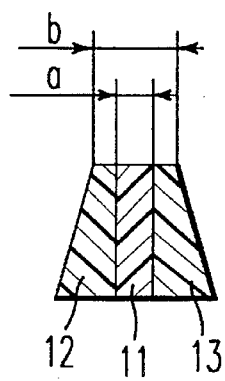
[FIG. 2] A sectional view across the 2—2 section in FIG. 1.

The molding width of the exposed surface of above ornamental core 11 in the direction in which it intersects orthogonally in the longitudinal direction, is changed along the longitudinal direction. That is, in the position shown in FIG. 2, the molding width of the exposed surface of ornamental core 11 is set at "a". After a fixed length is continuously molded with this molding width a, it is widened so as to be of a linear taper form.

Figure 3:
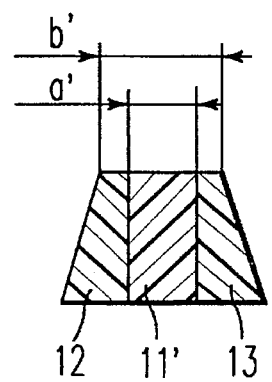
[FIG. 3] A sectional view across the 3—3 section in FIG. 1.
Figure 4:
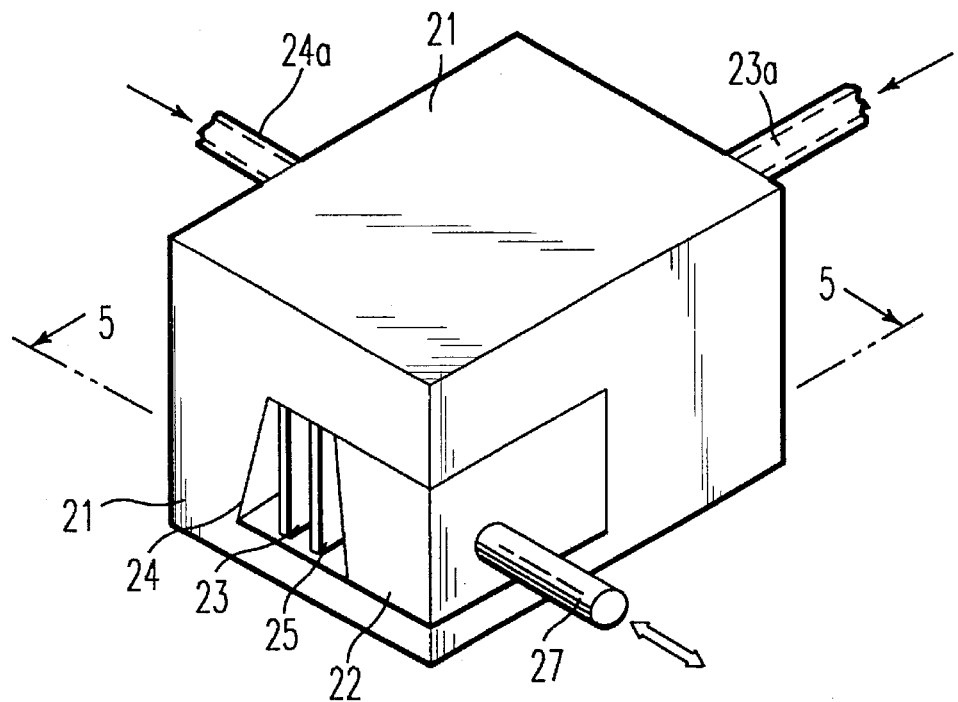
[FIG. 4] An inclined explanatory drawing of an example of the extrusion molding equipment of the molding as indicated in FIG. 1.

After the molding width is widened up to a specified level, it is continued again at this specified widened molding width. In the position shown in FIG. 3, the molding width of the exposed surface of ornamental core 11' is set at "a'" (a'>a).

The total molded width of molding 1, namely, the combined molding width of ornamental core 11 and the molding widths of trimmings 12 and 13, is changed in accordance with the change of molding width from a to a' in ornamental core 11. That is, in the position shown in FIG. 2, the total molding width of molding 1 is also set at "b". After a fixed length is continuously molded at this molding width b, it is widened so as to have a linear taper form. After the molding width is widened up to a specified level, it is continued at this specified widened molding width in the position shown in FIG. 3, the total molding width of molding 1 is set at "b'" (b'>b). At this time, the molding width of trimmings 12 and 13 is kept at a fixed level along the longitudinal direction.

Thus, in molding 1 in this exemplary embodiment, the total molding width is changed along the longitudinal direction in accordance with the molding width of ornamental core 11, and trimmings 12 and 13 of a fixed width and of a different color are installed along the sides of ornamental core 11. Accordingly, the ornamental properties of molding 1 are very high.

Referring next to the dies of the extrusion molding machine used to mold molding 1, main flow path 23 through which above ornamental core 11 is fed, is through-molded linearly along main axis 21a in the housing of box-shaped fixed die 21 as shown in FIGS. 4 to 7. The red PVC resin material sent from supply port 23a provided on the inlet side of this main flow path 2S is extruded in the form of the above rectangular transverse section through nozzle part 23b on the outlet side. On the side of his main flow path 23, subsidiary flow paths 24 and 25 are provided side by side and supply port 24a is opened on the side of the housing of above fixed die 21.

The black PVC resin material sent from this supply port 24a is extruded in the form of the above trapezoid transverse section through nozzle parts 24b and 25b on the outlet side in the above subsidiary flow paths 24 and 25.

Approximately half of above main flow path 23 and subsidiary flow path 24 are provided at fixed die 21 and the other half of main flow path 23 and subsidiary flow path 25 are provided a movable die 22.

This movable die 22 is installed so that it may freely perform reciprocating motion in the direction in which it intersects orthogonally with the main axis 21a and is designed to be freely moved through connecting rod 27 projecting to the side of movable die 22. In the housing of above movable die 22, wall surface 22a comprising a half of above main flow path 23 is formed, and above main flow path 23 is composed by placing this wall surface 22a and wall surface 21b formed in the housing of fixed die 21, face-to-face.

The path-crossing area of main flow path 23 is adjusted by this through the movement of movable die 22.

Figure 5:
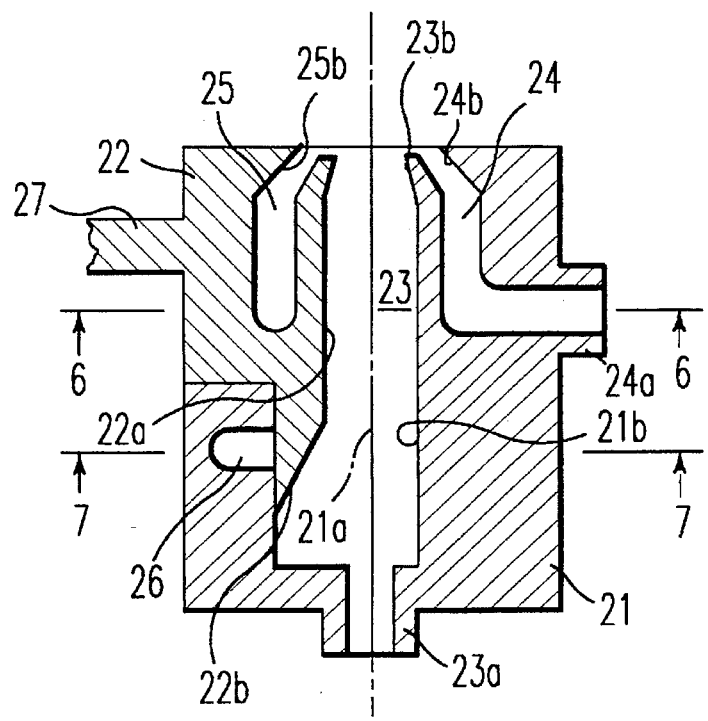
[FIG. 5] A horizontal sectional view across the 5—5 section in FIG. 4.
Figure 8:
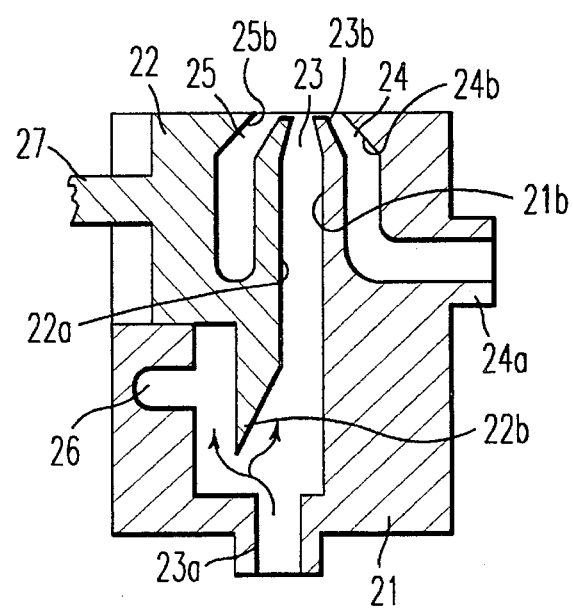
[FIG. 8] A horizontal sectional view corresponding to FIG. 5 indicating the status after the die is moved.
Figure 9:
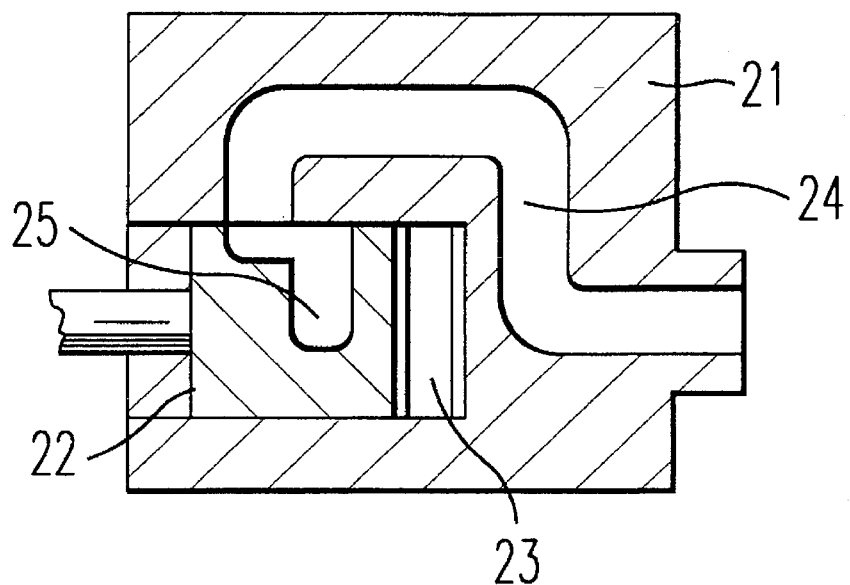
[FIG. 9] A side sectional view corresponding to FIG. 6 indicating the status after the die is moved.

For example, FIG. 5 shows he state where movable die 22 is brought near the full open position of main flow path 23. When movable die 22 is moved from the position shown in FIG. 5 to that shown in FIG. 8, the passage width of main flow path 23 is reduced by the movement of movable die 22, being put into a half-open state.

Wedge-shaped branch piece 22b is provided at the movable die 22 in such as way that it is continuous from wall surface 22a of above movable die 22 to the inlet side on the lower side shown in FIG. 5. This branch piece 22b diverts a part of the resin material sent from above supply port 23a, and an acute-angle edge end is formed between the inclined surface facing main flow path 23 side and the plain surface facing the housing side of fixed die 21.

Figure 7:
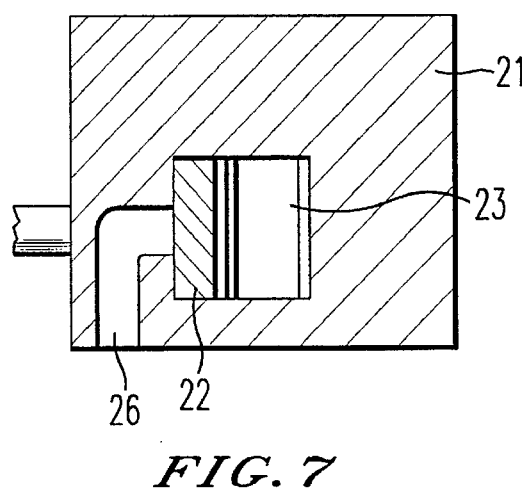
[FIG. 7] A side sectional view across the 7—7 section in FIG. 5.
Figure 10:
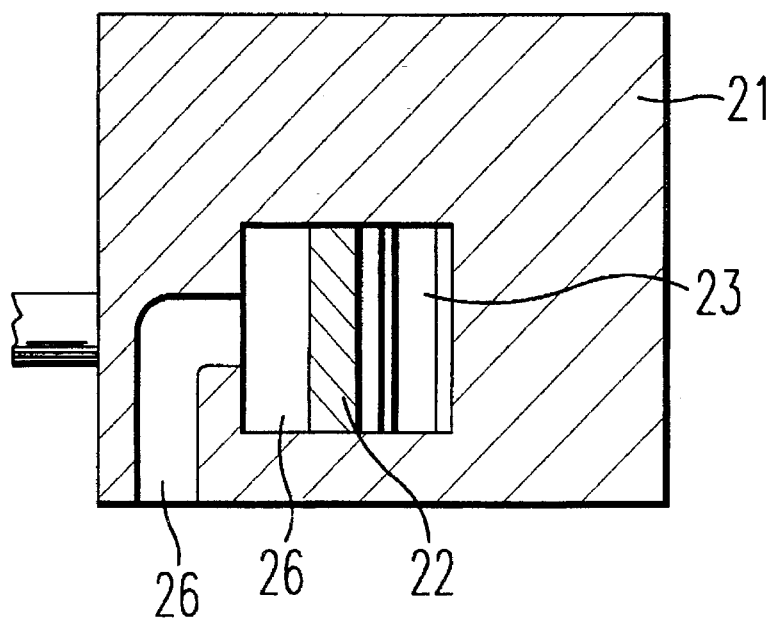
[FIG. 10] A side sectional view corresponding to FIG. 7 indicating the status after the die is moved.

On the other hand, on the housing surface of fixed die 21 corresponding to the plain surface of this branch piece 22b, branch path 26 which is opened and closed by branch piece 22b, is opened. This branch path 26 is provided, as best indicated in FIGS. 7 and 10, with an opening to the main flow path 23 side and is opened outwards extending in an approximate L-shape in the housing of fixed die 21 from this opening, to allow any excess resin material in the main flow path 23 to be discharged.

Figure 6:
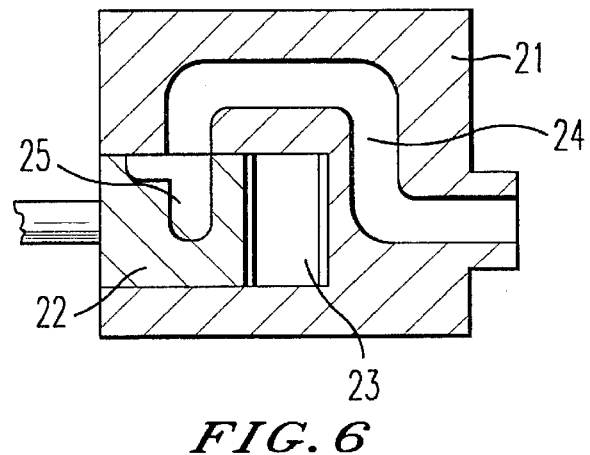
[FIG. 6] A side sectional view across the 6—6 section in FIG. 5.

The housing of above movable die 22 is provided with subsidiary flow path 28 at one side. This subsidiary flow path 25 is connected, as best indicated in FIG. 6, to the other subsidiary flow path 24 provided on the fixed die 21 side, by means of an arc-shaped flow path.

From these subsidiary flow paths 24 and 25, a fixed volume of resin material is always extruded.

With these extrusion molding dies, if extrusion molding is performed by properly moving movable die 22, above molding 1 i.e., the molding provided with ornamental core 11 of different molding widths chanted along the longitudinal direction and the trimmings 12 and 13 of a fixed width, can be extrusion-molded. Accordingly, molding 1 that permits changing of the combined molding width of ornamental core 11 and trimmings 12 and 13 in accordance with the molding width of ornamental core 11 can be manufactured surely and easily.

Figure 11:
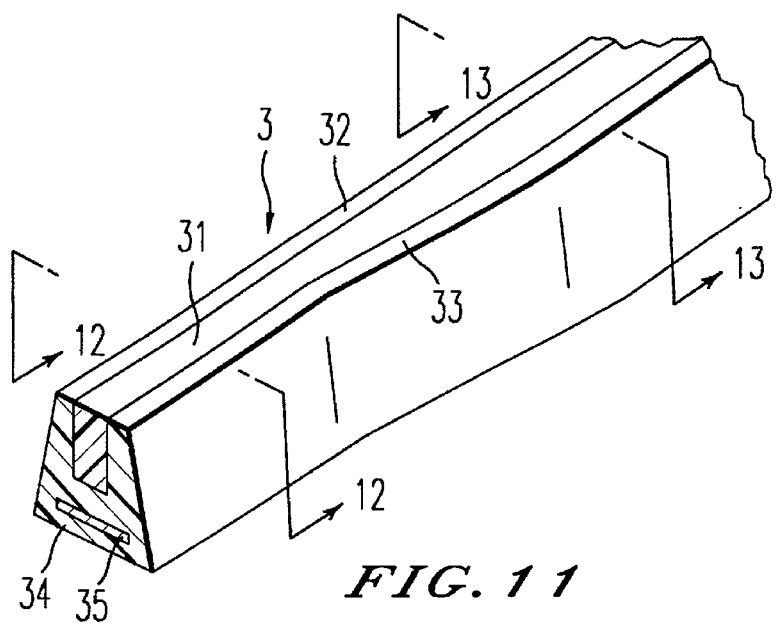
[FIG. 11] An inclined explanatory drawing of the structure of the molding in an additional embodiment of the invention.
Figure 12:
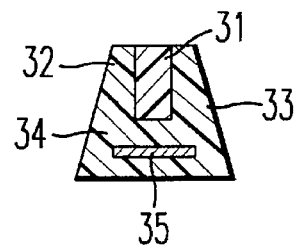
[FIG. 12] A side sectional view across 12—12 section in FIG. 11.
Figure 13:
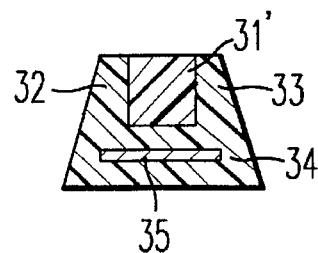
[FIG. 13] A side sectional view across the 13—13 section in FIG. 11.

In molding 3 to which the exemplary embodiment shown in FIG. 11 to 13 is to be applied, both trimmings 32 and 33 arranged on both sides of ornamental core 31 are coupled in a single integrated body through the adhering body 34. Adhering body 34 is arranged so as to cover the rear unexposed side being the side opposite the exposed surface of above ornamental core 31, and laminated thing foil 35 for reinforcement is implanted in adhering body 34.

Figure 14:
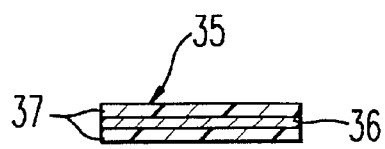
[FIG. 14] An enlarged side sectional view of the structure of the laminated thin foil as used for the molding indicated in FIG. 11.

This laminated thin foil 35 is made, as best indicated in FIG. 14 by sandwiching the front and back surfaces of metal thin foil 36 between adhesive layers 37 and 37.

To mold adhering body 34 of the molding to which this exemplary embodiment is to be applied, a means for providing a branch path for subsidiary flow paths 24 and 25 in the above extrusion molding machine is required.

Figure 15:
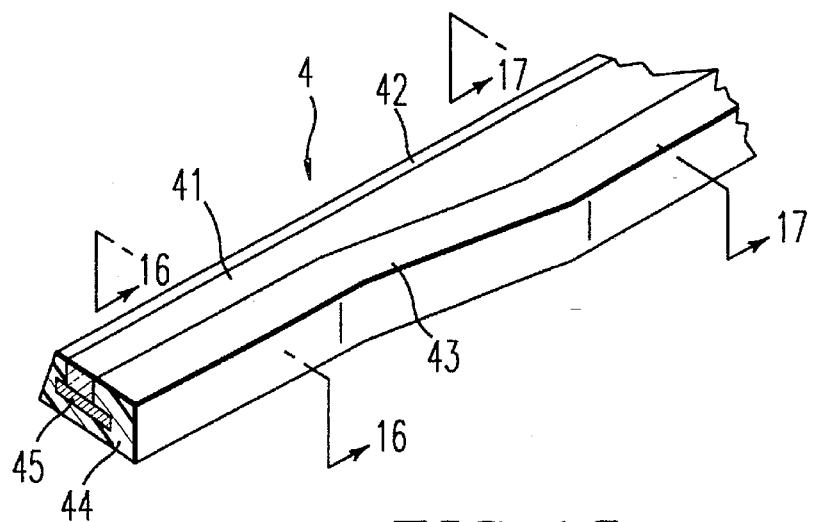
[FIG. 15] An inclined explanatory drawing of the structure of the molding in an additional embodiment of this invention.
Figure 16:
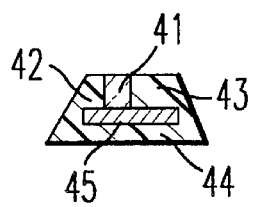
[FIG. 16] A side sectional view across the 16—16 section in FIG. 15.
Figure 17:
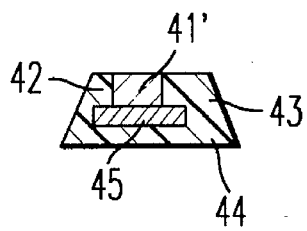
[FIG. 17] A side sectional view across the 17—17 section in FIG. 15.

In molding 4 in the exemplary embodiment shown in FIGS. 15 to 17, ornamental core 41 is molded from a transparent ionomer resin material and both trimmings 42 and 43 arranged on both sides of his ornamental core 41 are molded from a black PVC resin material.

Also, the above trimmings 42 and 43 are coupled in a single integrated body by means of adhering body 44. In the long narrow space formed by the top surface of adhering body 44, the internal sides o trimmings 42 and 43, and the bottom surface of ornamental core 41, laminated thin foil 45 is inserted in a close adhesion state.

Figure 18:
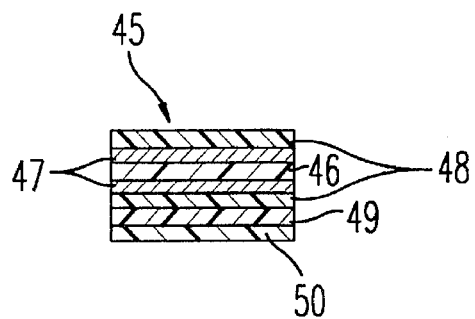
[FIG. 18] An enlarged side sectional view indicating the structure of the laminated thin foil as used in the molding indicated in FIG. 15.

The above laminated thin foil 45, as best indicated in FIG. 18, is made by covering both front and back surfaces of polyester resin film 46 with chrome metals 47 and 47 by the evaporation method. Ethylene copolymer resin films 48 and 48, being compatible with the ionomer comprising above ornamental core 41, are adhered to it by polymerization. In another words, since the resin film 48 and core 41 are combined in the forming/extrusion step, the resin film 48 and core 41 are directly melt bonded together, without additional adhesives therebetween. Also, ethylene copolymer resin film 48 being the top layer of this laminated thin foil 45 and the ornamental core 41 are melt bonded together. Moreover, PVC resin sheet 50 is glued by polymerization or melt bonded from the lower-side surface shown in the figure through adhesive layer 49 to ethylene copolymer resin film 48 on the lower side shown in the figure.

This PVC resin sheet is compatible with the PVC resin comprising above adhering body 44 and PVC resin sheet 50 being the bottom layer of laminated thin foil 45, and adhering bodies 44 of the trimming are melt bonded together.

Thus, since the shiny chrome metal layer is provided on the surface (the top surface shown in the figure) of this laminated thin foil 45, the chrome metal color being the surface color of laminated thin foil 45 which is visible from outside through ornamental core 41.

By the exemplary embodiment where ornamental core 41 is molded from transparent resin and the surface color of laminated thin foil 45 closely adhered to ornamental core 41 is caused to appear, the ornamental properties can be further enhanced.

By changing the composition of laminated thin foil 45 in the above exemplary embodiment, other tints can be provided.

For example, a transparent ethylene copolymer resin film (see code No.48 in. FIG. 18) is melt bonded to the surface of the polyester resin film (see code No.46 in FIG. 18) through an adhesive layer as a coloring agent, and the PVC resin sheet (see code No.50 in FIG. 18) is adhered by polymerization, or, in other words, is melt bonded on the back surface of the above polyester resin film (see code No.46 in FIG. 18) through an adhesive layer.

Moreover, other tints can be obtained by changing the resin color of ornamental core 41.

Figure 19:
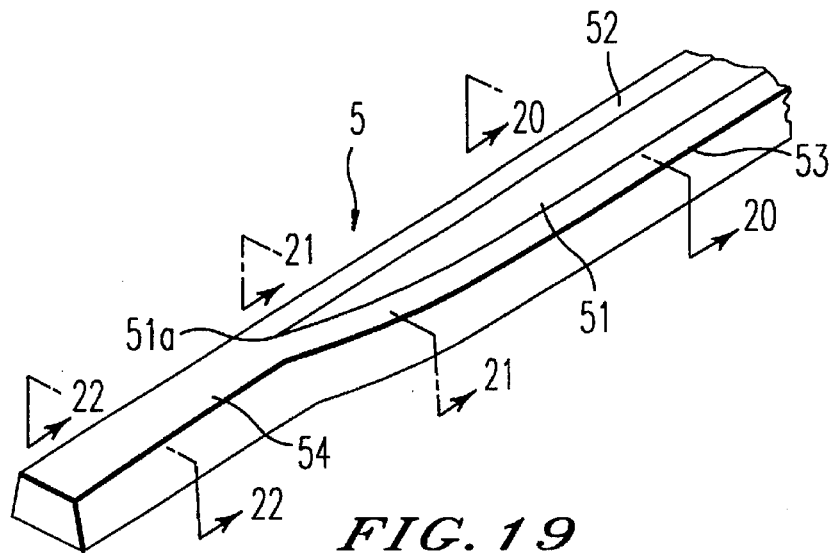
[FIG. 19] An inclined explanatory drawing indicating the structure of the molding in an embodiment of this invention.

In molding 5 shown in FIG. 19, ornamental body 51 are molded in an elongated form and trimmings 52 and 53 are molded so that they can be placed along both sides of this ornamental core 51, in a single integrated body. Ornamental core 51 is made, for example, by extrusion molding of a red PVC resin material and the transverse sections intersecting orthogonally in the longitudinal direction are shaped in rectangular form, and the surface of the upper side shown in the figure is exposed to the outside.

Each of trimmings 52 and 53 is made, for example, by extrusion molding of a black PVC resin material and are provided on a trapezoid transverse section with one side inclined.

Figure 20:
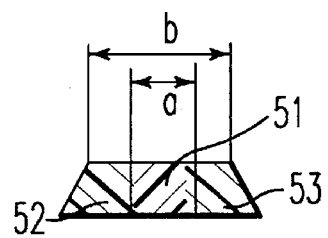
[FIG. 20] A side sectional view across the 20—20 section in FIG. 19.
Figure 21:
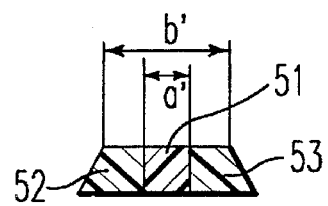
[FIG. 21] A side sectional view across the 21—21 section in FIG.19.

The molding width of the exposed surface of above ornamental core 51 in the direction in which it intersects orthogonally in the longitudinal direction is changed along the longitudinal direction. That is, in the position shown in FIG. 20, the molding width of the exposed surface of ornamental core 51 is set at "a". After a fixed length is continuously molded at this molding width a, it is narrowed down to a linear taper form. For example, in the position shown in FIG. 21, the molding width of the exposed surface of ornamental core 51 is set at "a'" (a'>a).

The total molded width of molding 5, namely, the combined molded widths of ornamental core 51 and of trimmings 52 and 53, is changed in accordance with the molded width changes of a to a' in ornamental core 1. That is, in the position shown in FIG. 20, the total molded width of the exposed surface of molding 5 is set at "b". After a fixed length is continuously molded with this molded width b, it is narrowed down to a linear taper form. For example, in the position shown in FIG. 21, the total molded width of the exposed surface of molding 5 is set at "b'" (b'>b). At this time, the molded width of edge bodies 52 and 53 themselves is kept along the longitudinal direction.

Figure 22:
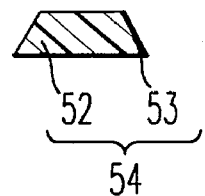
[FIG. 22] A side sectional view across the 22—22 section in FIG. 19.

In the rear end part of the narrowed section of ornamental core 51, the narrowed section 51a is formed. At this narrowed section 51a, ornamental core 51 is discontinued and the above trimmings 52 and 53 are joined together to provide merging section 54. Merging section 54 of trimmings 52 and 53 is continuously provided in such a way that it projects linearly from narrowed section 51a of above ornamental core 51. Its transverse sectional form is, as shown in FIG. 22, a trapezoid made by integrating both trimmings 52 and 53.

Thus, in molding 5 in this exemplary embodiment, the changeability in appearance or ornamentality of molding 5 can be improved by forming the narrowed section 51a by the changes in the molded width of ornamental core 51 in the longitudinal direction, and by providing merging section 54, made by integrating trimmings 52 and 53 provided on both sides of ornamental core 51. In this exemplary embodiment especially, as trimmings 52 and 53 of a fixed width and a different color are provided on the side of ornamental core 51, the ornamental properties of molding 5 are substantially enhanced.

Figure 23:
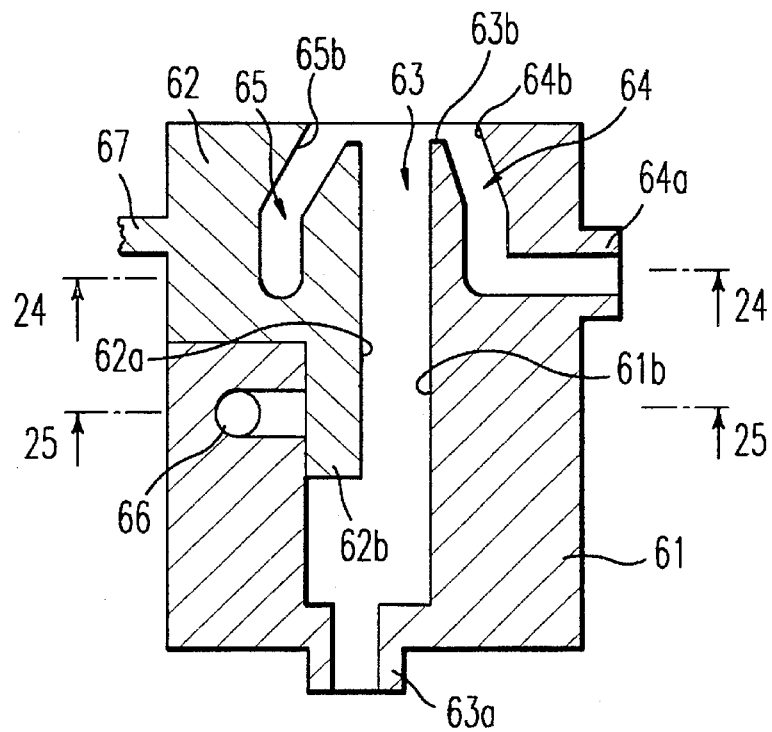
[FIG. 23] An explanatory horizontal sectional view showing an example of the extrusion molding equipment for the molding as is indicated in FIG. 19.
Figure 24:
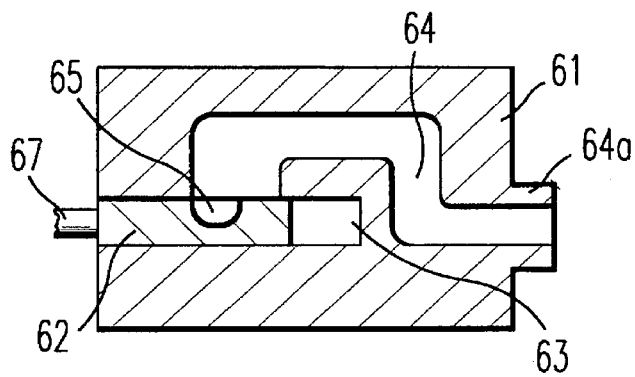
[FIG. 24] A horizontal sectional view across the 24—24 section in FIG. 23.
Figure 25:
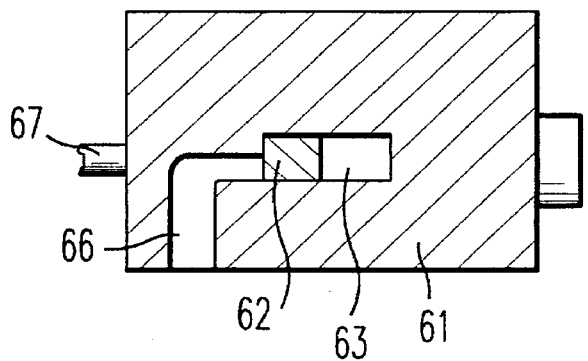
[FIG. 25] A side sectional view across the 25—25 section in FIG. 24.

Referring next to the dies of the extrusion molding machine used to mold molding 5, main flow path 63 through which above ornamental core 51 is fed, is through-molded linearly in the housing of box-shaped fixed die 61 as shown in FIGS. 23 to 25.

The red PVC resin material sent from supply port 63 provided on the inlet side of this main flow path 63 is extruded in the form of the above rectangular transverse section through nozzle part 63b on the outlet side. On the side of this main flow path 63, subsidiary flow paths 64 and 65 are provided side by side and supply port 64a is opened on the side of the housing of above fixed die 61.

The black PVC resin material sent from this supply port 64a is extruded in the form of the above trapezoid transverse section through nozzle parts 64b and 65b on the outlet side in the above subsidiary flow paths 64 and 65.

Approximately half of above main flow path 63 and subsidiary flow path 64 are provided at fixed die 61 and the other half of main flow path 63 and subsidiary flow path 65 are provided at movable die 62.

This movable die 62 is installed so that it may freely perform reciprocation motion in the direction in which it intersects orthogonally with the material extruding direction, and is designed to be freely moved through connecting rod 67 projecting to the side of movable die 62. Wall surface 62a comprising half of the above main flow path 63, is formed in the housing of above movable die 22, and above main flow path 63 is composed by putting this wall surface and wall surface 61i formed in the housing of fixed die 61 together face-to-face.

Figure 26:
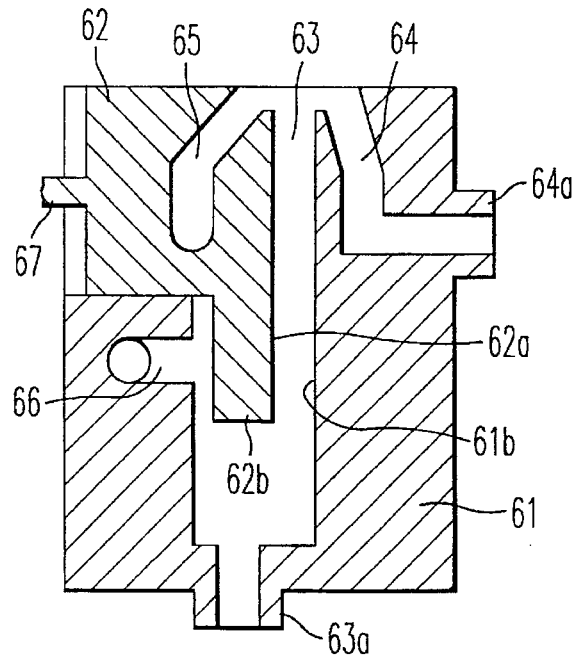
[FIG. 26] An explanatory horizontal sectional view corresponding to FIG. 23 indicating a half-open status after the die is moved.
Figure 27:
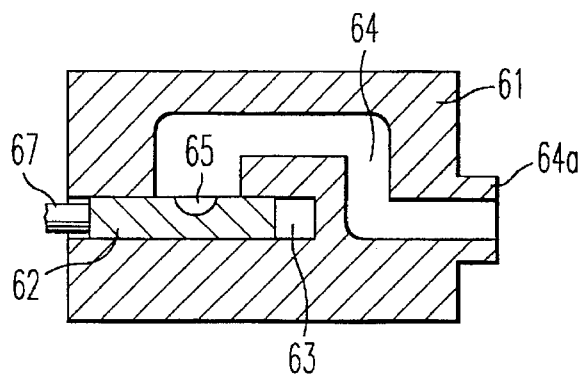
[FIG. 27] A side sectional view corresponding to FIG. 24 indicating a half-open status after the die is moved.

The path crossing area of main flow path 63 is adjusted by this through the movement of movable die 62. For example, FIG. 23 shows the state where movable die 62 is brought near the full open position of main flow path 63. When movable die 62 is moved from the position shown in FIG. 23 to that shown in FIG. 26, the passage width of main flow path 63 is reduced by the movement of movable die 62, which is set to a half-open state.

Branch piece 62b is provided in such a way that it is continuous from wall surface 62a of the above movable die 62 to the lower side shown in FIG. 23. This branch piece 62b diverts a part of the resin material sent from above supply port 63a, and has a plain surface for the branch between the plain surface facing the main flow path 63 side and the plain surface facing the housing of fixed die 61. On the other hand, branch path 66 which is opened and closed by branch piece 62b is opened on the housing surface of fixed die 61 in connection with branch piece 62b.

Figure 28:
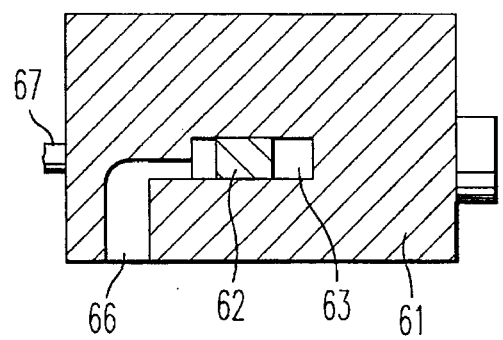
[FIG. 28] A side sectional view corresponding to FIG. 25 indicating a half-open status after the die is moved.

This branch path 66 is provided, as best indicated in FIGS. 25 and 28, with an opening to the main flow path 63 side and is opened outwards extending in an approximate L-shape in the housing of fixed die 61 from this opening, so that any excess resin material in the main flow path may be discharged.

The housing of above movable die 62 is provided with subsidiary flow path 65 on one side. This subsidiary flow path 65 is joined, as best indicated in FIG. 24, to the other subsidiary flow path 64 provided on the fixed die 61 side by means of an arc-shaped flow path.

From these subsidiary flow paths 54 and 65, a fixed volume of resin material is always extruded.

Figure 29:
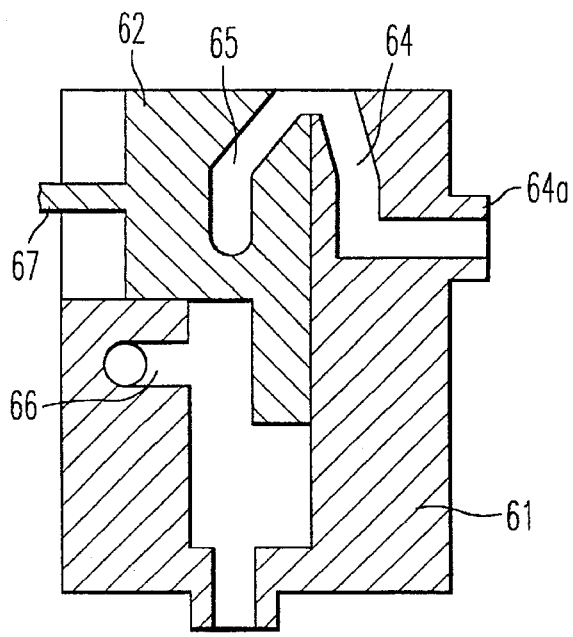
[FIG. 29] An explanatory horizontal sectional view corresponding to FIG. 23 indicating the totally-closed status after the die is moved.
Figure 30:
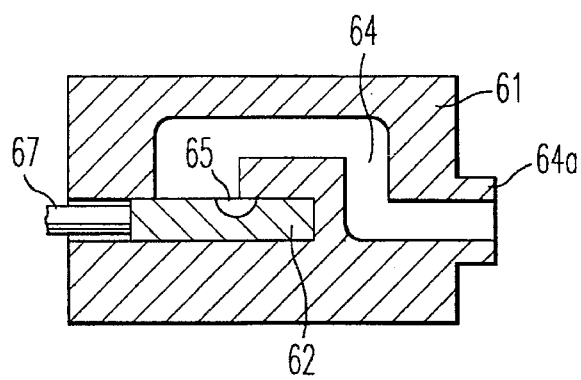
[FIG. 30] A side sectional view corresponding to FIG. 24 indicating the totally-closed status after the die is moved.
Figure 31:
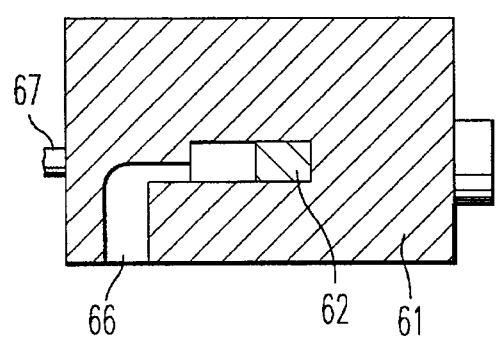
[FIG. 31] A side sectional view corresponding to FIG. 25 indicating the totally-closed status after the die is moved.

As shown in FIGS. 29 to 31, when the movable die is brought to the left side as shown in the figure, main flow path 63 completely closed to stop the extrusion of the ornamental core and the extrusion of both trimmings 52 and 53 is continued.

With these extrusion molding dies, if extrusion molding is performed by properly moving movable die 62, above molding 5 or ornamental core 51 provided with the narrowed section with changes in molded width along the longitudinal direction, and trimmings 52 and 53 provided with merging section 54 of fixed width, can be extrusion-molded easily and surely.

Figure 32:
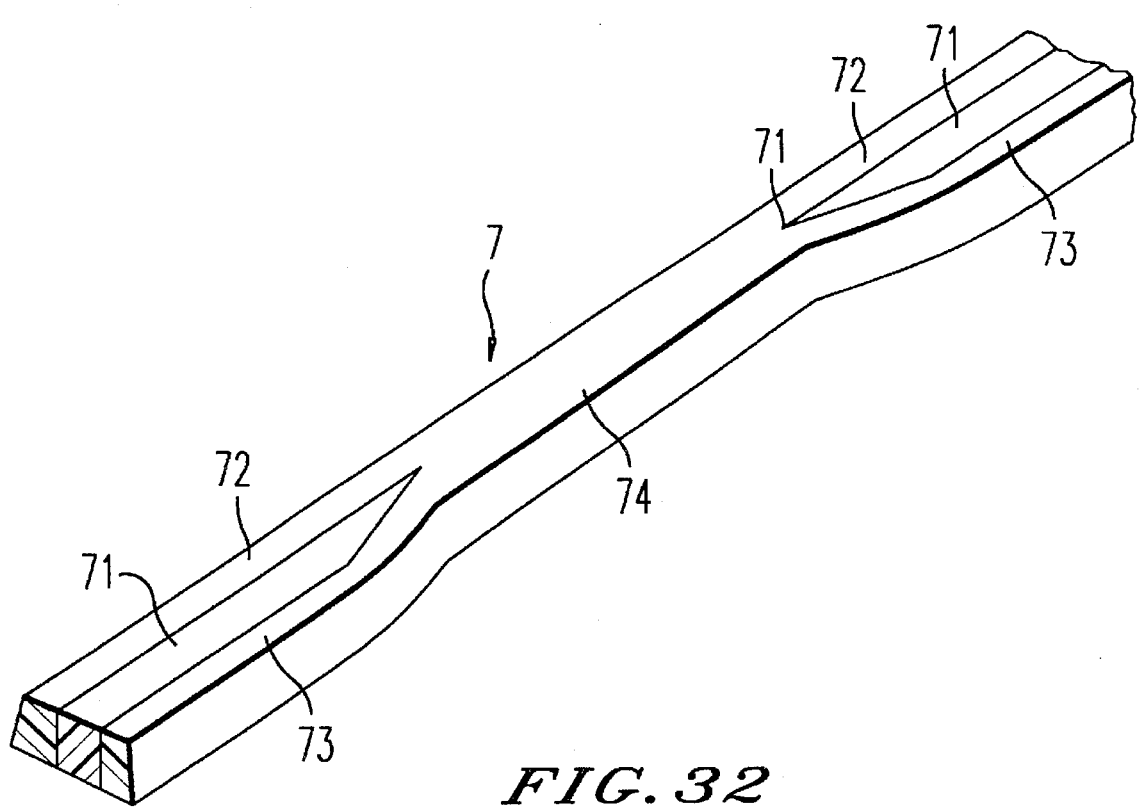
[FIG. 32] An inclined explanatory drawing indicating the structure of the molding in another embodiment of this invention.

In molding 7 to which the exemplary embodiment shown in FIG. 32 is to be applied, several ornamental cores 71 are arranged along the longitudinal direction. The narrowed sections 71a and 71a provided in ornamental cores 71 and 71 adjacent to the longitudinal direction, are arranged face to face at a fixed interval. In the section between these vanishing sections 71a and 71a, merging section 74 of trimmings 72 and 73 are formed, extending over a specified length.

In molding 7 made by molding merging section 74 of trimmings 72 and 73 extending over a specified length, as shown in this exemplary embodiment, the change in appearance is much more apparent as compared with the previous exemplary embodiments, so that the ornamental properties can be further enhanced.

What is claimed is:

1. A method for forming a molding comprising:

providing a laminated foil, said laminated foil including an upper layer and a lower layer;

extrusion molding an ornamental core, and joining a surface of said ornamental core to said upper layer of said laminated foil during said extrusion molding and before said ornamental core has completely cured such that said surface of said ornamental core is melt bonded to said upper layer of said laminated foil; and extrusion molding a trimming, and joining a surface of said trimming to said lower layer of said laminated foil before said trimming has completely cured such that said surface of said trimming is melt bonded to said lower layer of said laminated foil;

wherein the step of extrusion molding said trimming includes extrusion molding said trimming with a base and first and second side portions, wherein said surface of said trimming which is melt bonded to said lower layer of said laminated foil is disposed on said base.

2. A method as recited in claim 1, wherein said ornamental core includes a top surface, a rear surface, and first and second side surfaces, and wherein said surface of said ornamental core which is melt bonded to said upper layer of said laminated foil is said rear surface, the method further including disposing said ornamental core between said first and second side portions of said trimming such that said first and second side portions of said trimming respectively extend along said first and second side surfaces of said ornamental core.

3. A method as recited in claim 2, wherein said ornamental core includes a width extending from said first side surface to said second side surface, and wherein the step of extrusion molding said ornamental core includes changing the width of said ornamental core such that said width varies along a longitudinal direction of said ornamental core.

4. A method as recited in claim 1, wherein said ornamental core includes a width extending transverse to a longitudinal direction of said ornamental core, and wherein the step of extrusion molding said ornamental core includes changing the width of said ornamental core such that said width varies along the longitudinal direction of said ornamental core.

5. A method for forming a molding comprising:

extrusion molding an ornamental core having first and second side surfaces;

extrusion molding a first trimming portion and joining said first trimming portion to said first side surface of said ornamental core;

extrusion molding a second trimming portion and joining said second trimming portion to said second side surface of said ornamental core; and after extruding said first and second trimming portions and joining said first and second trimming portions to the first and second side surfaces of the ornamental core, discontinuing extrusion molding of said ornamental core while continuing extrusion molding of said first and second trimming portions, and merging said first and second trimming portions to form a third trimming portion at a location of said molding which does not include an ornamental core.

6. A method as recited in claim 5, wherein said ornamental core has a width extending from said first side surface to said second side surface, and wherein the step of extrusion molding said ornamental core includes changing said width during extrusion molding such that said width varies along a longitudinal direction of said ornamental core.

7. A method as recited in claim 6, wherein the steps of extrusion molding said first and second trimming portions includes extrusion molding said first and second trimming portions with each having constant widths with respect to a longitudinal direction of said molding.

8. A method as recited in claim 7, wherein the first and second trimming portions are joined to said first and second side surfaces before said ornamental core and said first and second trimming portions have completely cured such that said first trimming portion is melt bonded to said first side surface and said second trimming portion is melt bonded to said second side surface.

9. A method as recited in claim 5, wherein the first and second trimming portions are joined to said first and second side surfaces before said ornamental core and said first and second trimming portions have completely cured such that said first trimming portion is melt bonded to said first side surface and said second trimming portion is melt bonded to said second side surface.

10. A method as recited in claim 5, wherein said extrusion molding steps include extrusion molding said first and second trimming portions through respective first and second outlets of an extrusion die, and extrusion molding said ornamental core through a third outlet of said extrusion die, and the step of discontinuing extrusion molding of said ornamental core includes blocking a flow of material to said third outlet.

11. A method as recited in claim 10, further including providing a connecting passage which connects said first and second outlets to a common source of trimming material.

12. A method for forming a molding comprising:

extrusion molding an ornamental core having first and second side surfaces;

extrusion molding first and second trimming portions; and joining said first and second trimming portions, respectively, to said first and second side surfaces of said ornamental core prior to complete curing of said ornamental core and said first and second trimming portions such that said first trimming portion is melt bonded to said first side surface with a melt bond between a material of said first trimming portion and a material of said ornamental core, and such that said second trimming portion is melt bonded to said second side surface with a melt bond between a material of said second trimming portion and the material of said ornamental core;

wherein said ornamental core has a width extending from said first side surface to said second side surface, and wherein the step of extrusion molding said ornamental core includes changing said width such that said width of said ornamental core varies along a longitudinal direction of said ornamental core.

13. A method as recited in claim 12, further including providing an extrusion die having first, second, and third outlets, extrusion molding said first and second trimming portions, respectively, through said first and second outlets, and extrusion molding said ornamental core through said third outlet.

14. A method as recited in claim 13, further including blocking a flow to said third outlet and while continuing to extrusion mold said first and second trimming portions, and joining said first and second trimming portions together after blocking the flow to said third outlet.

* * * * *